(12) United States Patent
DiGiacomo (10) Patent No.: US 6,355,288 B1
(45) Date of Patent: Mar. 12, 2002

(54) PASTA STUFFING MACHINE AND METHOD

(76) Inventor: Primo DiGiacomo, 2334 S. 21st St., Philadelphia, PA (US) 19145

( * ) Notice: Subject to any disclaimer, the term of this patent is extended or adjusted under 35 U.S.C. 154(b) by 0 days.

(21) Appl. No.: 09/475,737

(22) Filed: Dec. 30, 1999

(51) Int. Cl.[7] .............................. A21C 7/04; A21C 9/06; A23L 1/16
(52) U.S. Cl. ..................... 426/282; 99/450.6; 99/450.7; 426/297; 426/496; 426/502
(58) Field of Search .............. 99/450.1, 450.6, 99/450.7; 426/247, 512, 496, 502, 282, 283

(56) References Cited

U.S. PATENT DOCUMENTS

| | | | |
|---|---|---|---|
| 1,236,998 A | * 8/1917 | Tommasini | 99/450.6 |
| 2,450,033 A | 9/1948 | Cohen | |
| 2,855,867 A | * 10/1958 | Zeitlin | 99/450.6 |
| 3,026,822 A | 3/1962 | Gatti | |
| 3,669,007 A | 6/1972 | Pulici | |
| 3,690,248 A | 9/1972 | Schafer | 99/450.2 |
| 3,724,361 A | 4/1973 | Schafer | 99/450.6 |
| 3,782,271 A | * 1/1974 | Tobey et al. | 99/450.6 |
| 3,912,433 A | 10/1975 | Ma | |
| 4,381,906 A | * 5/1983 | Mancini | 99/450.6 X |
| 4,913,043 A | 4/1990 | Cheung | |
| 5,205,209 A | * 4/1993 | Tansini | 99/450.6 |
| 5,279,842 A | 1/1994 | Escola Gallart et al. | |
| 5,328,709 A | * 7/1994 | Larsen | 99/450.6 X |
| 5,405,256 A | * 4/1995 | Dalton | 99/450.6 X |
| 5,660,102 A | * 8/1997 | Askman et al. | 99/450.6 |
| 5,693,351 A | 12/1997 | Cuperus | |
| 5,912,035 A | * 6/1999 | Grat | 99/450.6 X |

FOREIGN PATENT DOCUMENTS

| | | |
|---|---|---|
| EP | 0 580 342 A1 | 1/1994 |
| GB | 2 228 708 A | 9/1990 |
| WO | WO 89/00008 A | 1/1989 |
| WO | WO 93/00013 A | 1/1993 |

* cited by examiner

*Primary Examiner*—Arthur L. Corbin
(74) *Attorney, Agent, or Firm*—Oliff & Berridge, PLC (57) ABSTRACT

A pasta stuffing machine includes a conveyor having mold cups affixed thereto. The mold cups are openable and closeable. A pasta shell is inserted into each mold cup. The conveyor moves the mold cups and pasta shells to a filling station at which a pasta shell filling is inserted within the pasta shell while the mold cup is open. A folding station causes the mold cup to close to fold leaves of the pasta shell on top of one another and around the pasta shell filling. The mold cups are opened downstream of the folding station to allow the pasta shell to exit the mold cup. A rolling station rolls the pasta shell and the pasta shell filling into a final shape.

32 Claims, 8 Drawing Sheets

PASTA STUFFING MACHINE AND METHOD

BACKGROUND OF THE INVENTION

1. Field of Invention

This invention relates to a machine and method for the production of filled pasta shells.

2. Description of Related Art

Traditionally, foods such as ravioli and tortellini which include a filling or stuffing wrapped in a pasta shell have been made by hand. The production of such stuffed pasta shell products by hand is labor intensive and costly. A machine that automatically fills a pasta shell and folds the shell around the pasta shell filling and rolls the pasta shell and pasta shell filling into a final shape having a traditional appearance appealing to consumers has yet to be developed.

U.S. Pat. No. 3,912,433 discloses an automatic egg roll making machine. A conveyor includes a plurality of conveyor plates which are hinged together. Egg roll skins are fed onto the conveyor by a feeding device which supplies an individually cut section of the egg roll skin onto each conveyor plate. A rotary turntable is located above the conveyor plates and is indexed to drop food stuffing onto the section of egg roll skin as each conveyor plate is beneath an opening in the rotary turntable. The food stuffing is dropped onto the section of egg roll skin at a location where the egg roll skin overlies a mold cup. The mold cup is-pivotally supported on the conveyor plate at a position below the conveyor plate by a hinge rod that is transverse to the conveying direction of the conveyor. Each conveyor plate also includes side folding plates that are pivotally mounted. The food stuffing is dropped onto the egg roll skin and compacted into the mold cup. The side folding plates are pivoted to fold opposing side corners in the egg roll skin. The mold cup is then pivoted from below the conveyor plate to above the conveyor plate to begin the rolling of the food stuffing. A bonding agent is sprayed on the exposed area of the egg roll skin and two rollers roll the egg roll into a final shape.

SUMMARY OF THE INVENTION

One aspect of the invention provides a machine and method for forming a filled pasta shell into a final shape having a traditional appearance pleasing to consumers.

A machine for filling a pasta shell according to a first aspect of the invention includes a conveyor having at least one mold cup that is openable and closeable and affixed to the conveyor, a filling station at which a pasta shell filling is inserted within the pasta shell while the mold cup is open, a folding station that causes the mold cup to close to thereby fold leaves of the pasta shell on top of one another and around the pasta shell filling, the mold cup opening downstream the folding station to allow the pasta shell to exit the mold cup, and a rolling station that rolls the pasta shell and pasta shell filling after being removed from the mold cup into a final shape.

A machine for handling a flexible food product according to another aspect of the invention includes a conveyor, a mold cup attached to the conveyor, the mold cup including first and second cup halves that are openable to receive a filling, and a folding station that causes the first and second mold cup halves to fold leaves of the flexible food product over the filling to form a folded, filled food product, the first and second cup halves opening following folding of the leaves to release the folded, filled food product.

A method for filling a pasta shell according to another aspect of the invention includes conveying a pasta shell within a mold cup to a filling station, filling the pasta shell with a pasta shell filling, and closing the mold cup to fold leaves of the pasta shell around the pasta shell filling.

These and other aspects of the invention will be described in or apparent from the following detailed description of preferred embodiments.

BRIEF DESCRIPTION OF THE DRAWINGS

Preferred embodiments of the invention will be described with reference to the following drawings, wherein.

DETAILED DESCRIPTION OF PREFERRED EMBODIMENTS

Figure 1A:
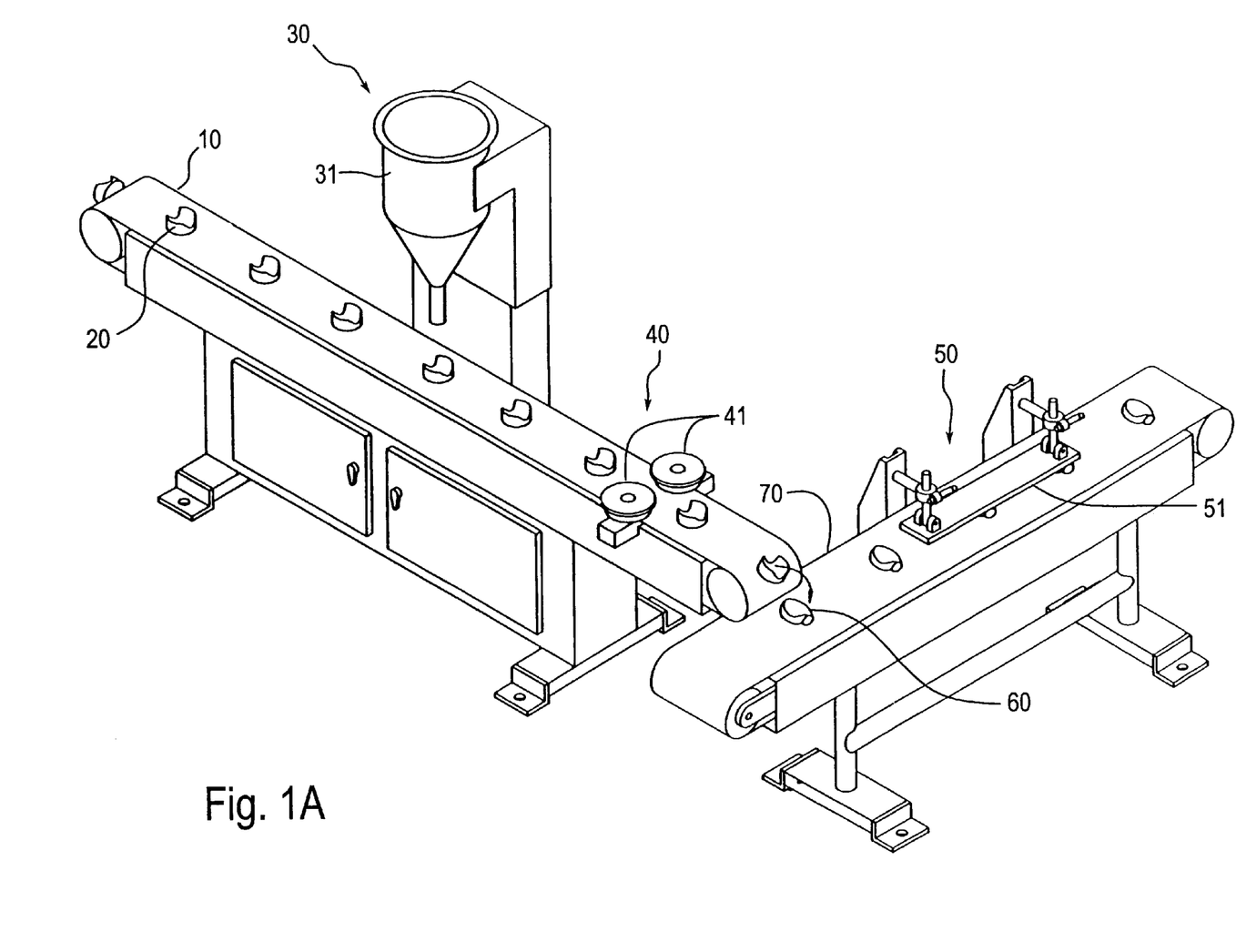
FIG. 1A is a schematic perspective view of a pasta stuffing machine according to one preferred embodiment of the invention.

Referring to FIG. 1A, a pasta stuffing machine according to one preferred embodiment of the invention includes a conveyor, e.g., an endless conveyor 10, and mold cups 20 that are openably and closeably affixed to the conveyor 10. The mold cups 20 are spaced apart on the conveyor 10, preferably at regular intervals. The speed of the conveyor 10 can be adjustable.

A pasta shell is placed into each mold cup 20. The pasta shells may be placed in the mold cups 20 by hand or automatically. The pasta shells may be uncooked, precooked, or made fresh. The pasta shells are pliable and fit into the mold cups 20. The conveyor 10 is indexed, by a cam for example, to sequentially move each mold cup 20 to a filling station 30. A hopper 31 at the filling station 30 fills the pasta shell in the mold cup 20 with a pasta shell filling starting from the bottom of the pasta shell and continuing in an upward direction. The hopper 31 dispenses a predetermined amount of pasta shell filling into each pasta shell. Filling the pasta shell from bottom eliminates air entrapment between the pasta shell and the pasta shell filling. The pasta shell filling may be a mixture of cheeses, meat, vegetables or combinations thereof.

The conveyor 10 moves the mold cup 20 with the filled pasta shell to a folding station 40. At the folding station 40, rotatable forming rolls 41 engage the mold cup 20 to close the mold cup 20. When the mold cup 20 is closed, outer edges or leaves of the pasta shell are folded on top of one another and the pasta shell filling instantly holds the folded leaves of the pasta shell into a shape that approximates a shape of the final product. The rotatable forming rolls 41 may be mounted so that the distance between their rotation axes is adjustable. The forming rolls 41 may also be placed along the conveyor 10 in a staggered or offset relationship to better ensure that the pasta shell leaves are folded on top of one another by closing one mold cup half before the other mold cup half.

Figure 1B:
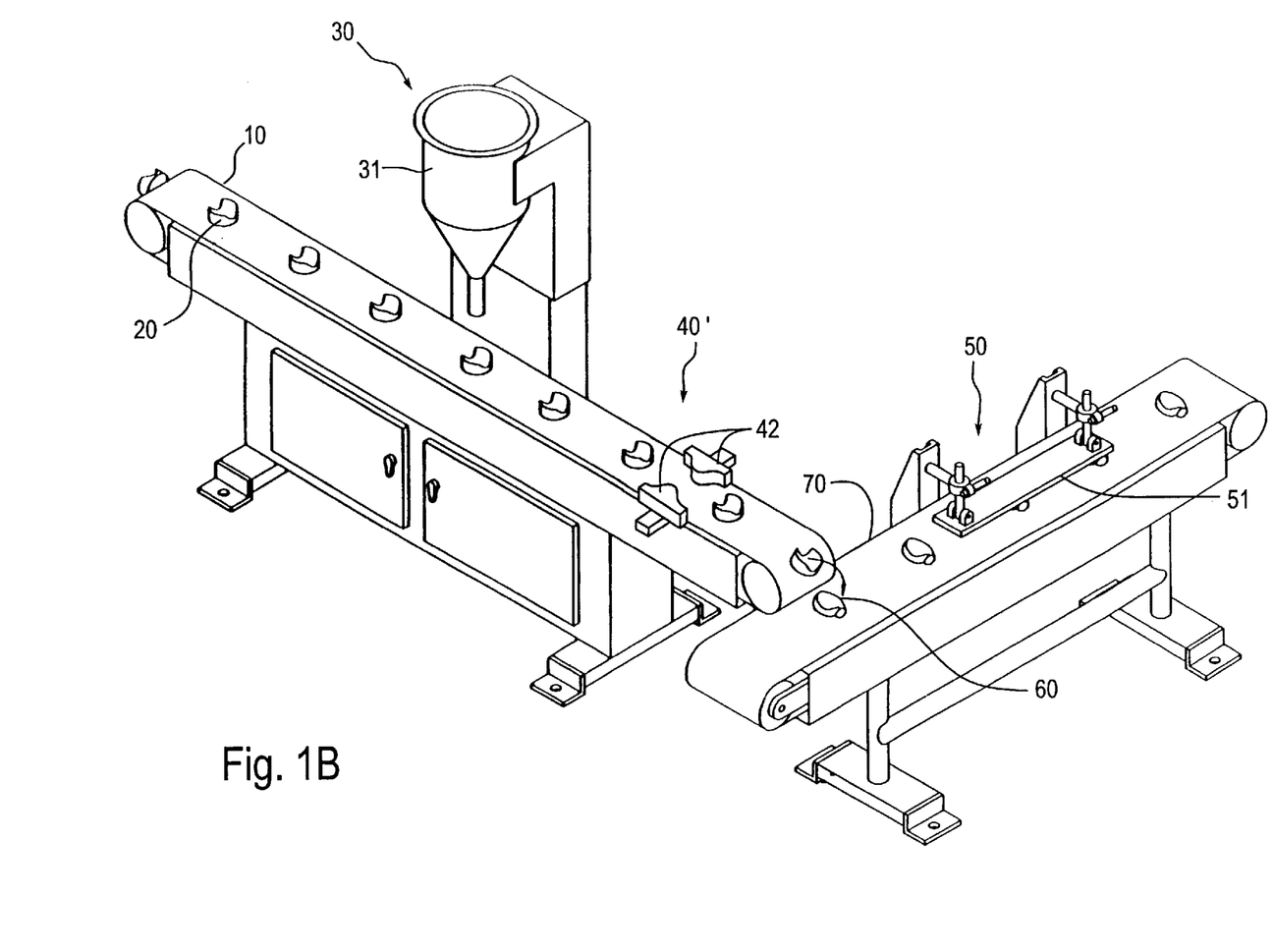
FIG. 1B is a schematic perspective view of a pasta stuffing machine according to another preferred embodiment of the invention.

Referring to FIG. 1B, the folding station 40' may include cams 42 that engage the mold cup 20 to close the mold cup 20. The cams 42 may be mounted so that the distance between them is adjustable. The cams 42 may also be placed along the conveyor 10 in a staggered or offset relationship to better ensure that the pasta shell leaves are folded on top of one another by closing one mold cup half before the other mold cup half. Although the cams 42 have been shown as positioned above the conveyor 10, it should be appreciated that the cams may be placed below the conveyor.

Figure 6:
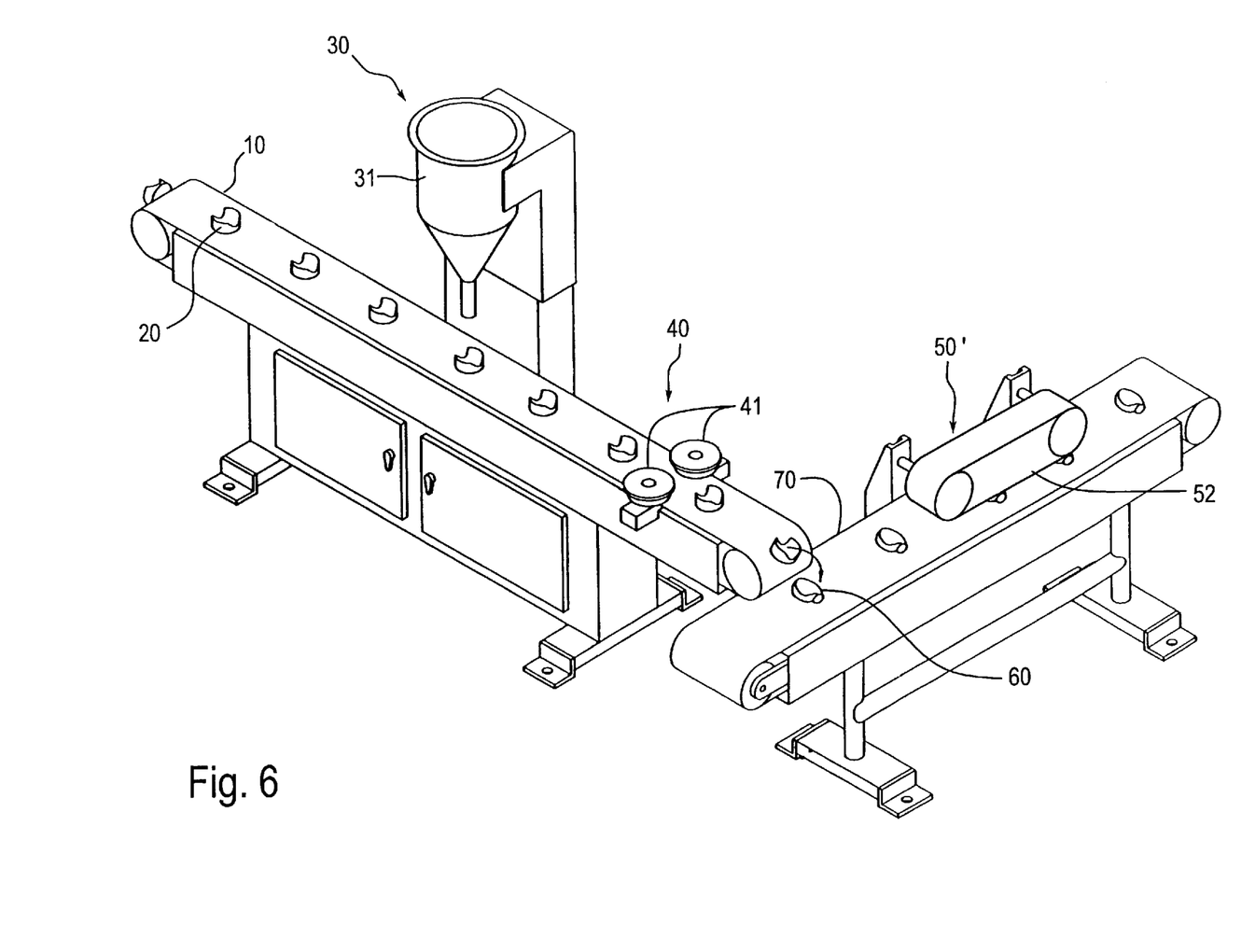
FIG. 6 is a schematic perspective view of a pasta stuffing machine according to another preferred embodiment of the invention.

When the conveyor 10 moves the mold cup 20 past the folding station 40, the mold cup 20 returns to the open position. The folded, filled pasta shell 60 is removed from the open mold cup 20 and is placed on a lower conveyor 70. The lower conveyor 70 moves the filled pasta shell 60 to a rolling station 50. The rolling station 50 includes an adjustable plate 51 above the lower conveyor 70 to roll the filled pasta shell 60 to ensure it is closed and properly shaped into the final product. As shown in FIG. 6, the rolling station 50' may include a top conveyor 52 above the lower conveyor 70 to roll the folded, filled pasta shell 60. The position and speed of the top conveyor 52 can be adjustable.

The filled pasta shells 60 exit the rolling station 50 and are removed from the lower conveyor 70 ready for freezing and packaging. The folded, filled pasta shells 60 may be laid on trays that are placed in a freezer once the tray is full of filled pasta shells or the lower conveyor may deliver the filled past shells directly into a freezer.

Although only one conveyor is shown in FIG. 1, it should be appreciated that multiple conveyors may be provided to increase the production capacity of the pasta stuffing machine. It should also be appreciated that the multiple conveyors may deliver the filled pasta shells to a single rolling station or multiple rolling stations. Although only one hopper 31 is shown at the filling station 30 in FIG. 1, it should be appreciated that multiple hoppers may be provided along the conveyor and the conveyor may be indexed to move each mold cup to each hopper of the filling station. Each hopper of the filling station may dispense a different pasta shell filling into each pasta shell to form a filled pasta shell having a plurality of pasta shell fillings.

Figure 2:
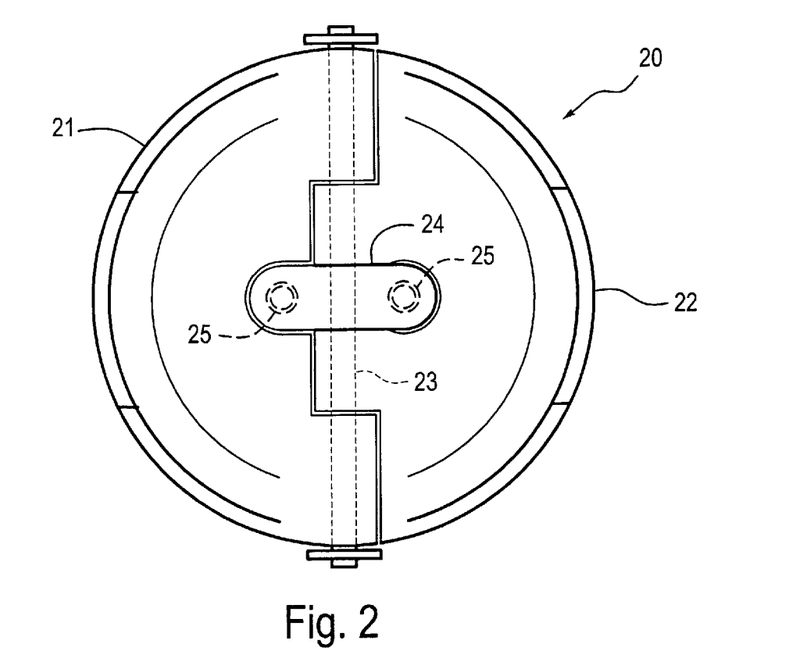
FIG. 2 is a plan view of a mold cup according to one preferred embodiment of the invention.
Figure 3:
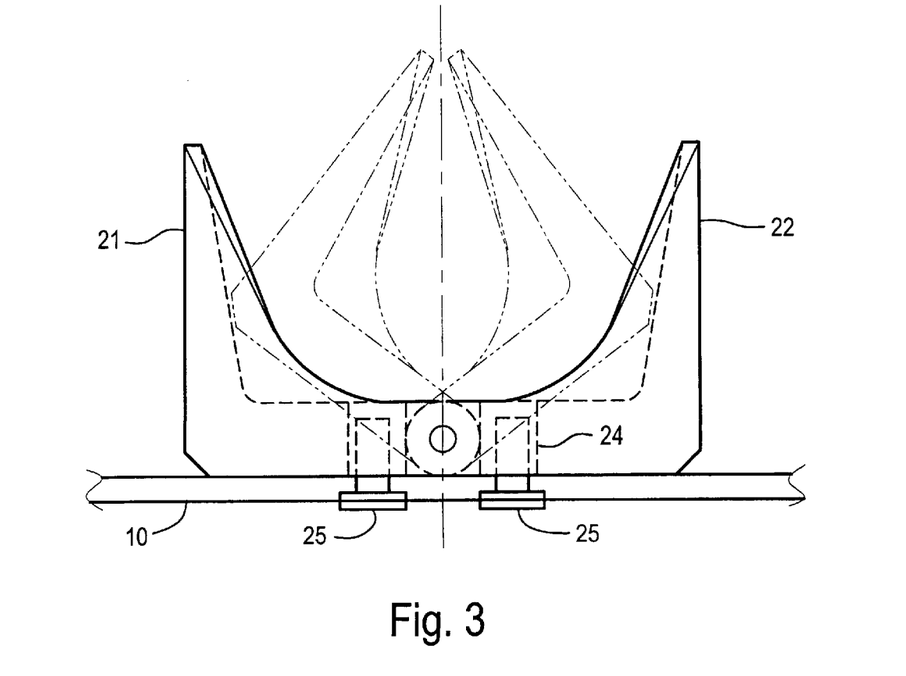
FIG. 3 is a side elevation view of a mold cup in the opened and closed positions according to one preferred embodiment of the invention.

As shown in FIG. 2, the mold cup 20 includes, for example, mold cup halves 21 and 22 hinged together by a pin 23. The pin 23 extends through a connector 24. As shown in FIG. 3, the connector 24 is fastened to the conveyor 10 by fasteners 25. The mold cup halves 21 and 22 pivot around the pin 23 from an open position, shown in solid lines in FIG. 3, to a closed position, shown in dotted lines in FIG. 3. The forming rolls 41 or cams 42 of the folding station engage or otherwise cause the mold cup halves 21 and 22 to pivot from the open position to the closed position.

Figure 4:
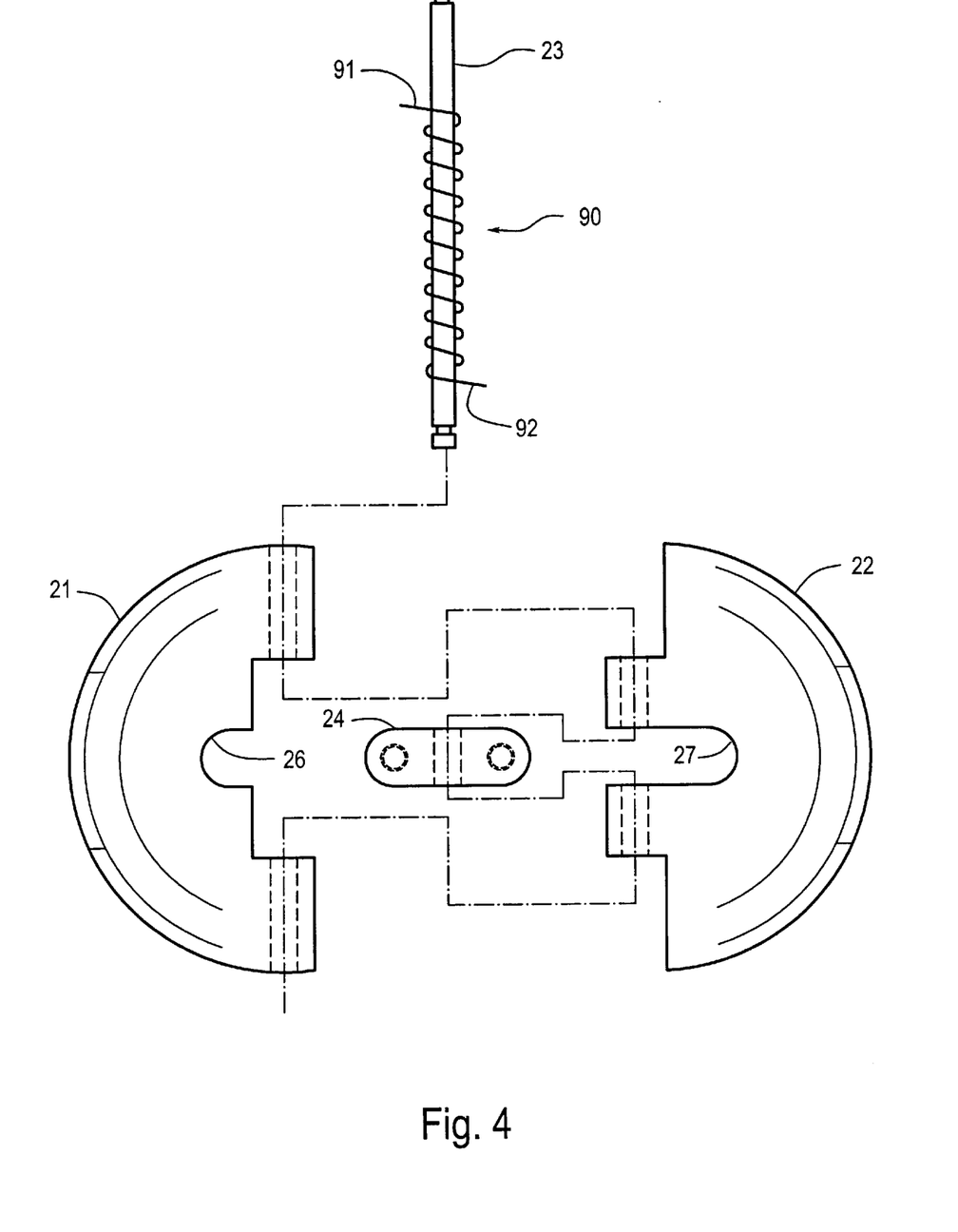
FIG. 4 is an assembly view of a mold cup according to one preferred embodiment of the invention.

As shown in FIG. 4, a spring 90 may be provided over the pin 23. One end 91 of the spring 90 may engage mold cup half 21 and another end 92 of the spring 90 may engage mold cup half 22. When the forming rolls 41 or cams 42 cause the mold cup halves 21 and 22 to close, the spring ends 91 and 92 are displaced. After the mold cup 20 exits the folding station 40 or 40', the spring ends 91 and 92 return the mold cup halves 21 and 22 to the open position. Although a single torsion spring has been shown, it should be appreciated that a plurality of springs may be provided. It should also be appreciated that other types of springs, such as, for example, a leaf spring or springs, may be used to engage the mold cup halves.

Although the mold cup halves 21 and 22 are shown connected by the pin 23, it should be appreciated that the mold cup halves 21 and 22 may be connected by any structure that allows the cup halves 21 and 22 to pivot relative to each other about an axis. For example, the cup halves 21 and 22 may be formed of a single plastic piece and pivot about an integrally formed living hinge so that the cup halves can fold the leaves of the food product being processed. Moreover, the mold cup halves 21 and 22 can simply bend with respect to one another in order to open and close the mold cup 20.

As shown in FIG. 4, each mold cup half 21 and 22 includes a recess 26 and 27, respectively. The recesses 26 and 27 fit around the connector 24 and the pin 23 fastens the mold cup halves 21 and 22 to the connector 24.

Figure 5:
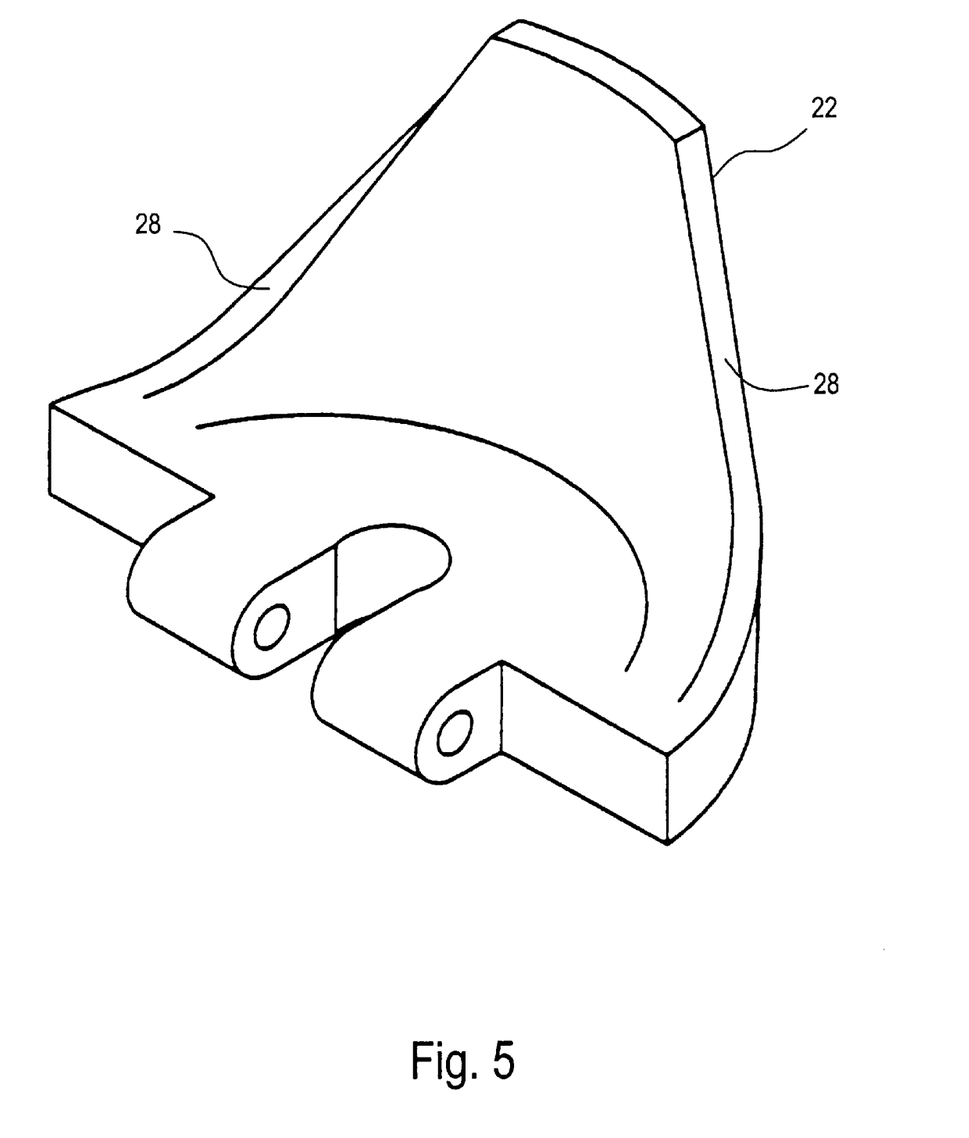
FIG. 5 is a perspective view of a mold cup half according to one preferred embodiment of the invention.

As shown in FIG. 5, each mold cup half has sloped side surfaces 28. When the mold cup 20 is in the closed position, as shown in dotted lines in FIG. 3, the sloped side surfaces 28 fold the leaves or outer edges of the pasta shell around the pasta shell filling and on top of one another to form the filled pasta shell 60.

Figure 7:
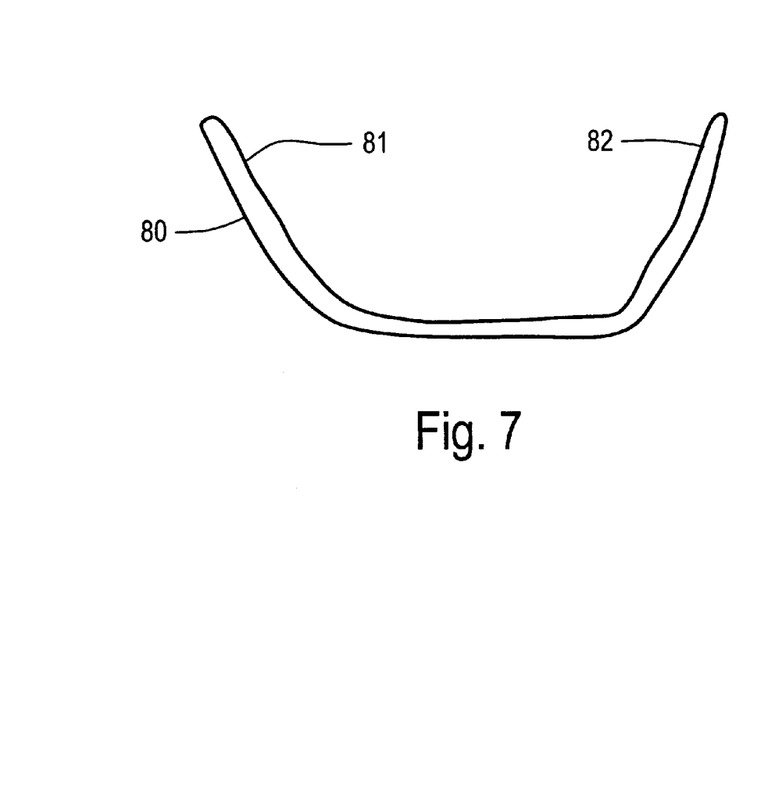
FIG. 7 is a side elevation view of a pasta shell according to one preferred embodiment of the invention prior to insertion of a pasta shell filling.
Figure 8:
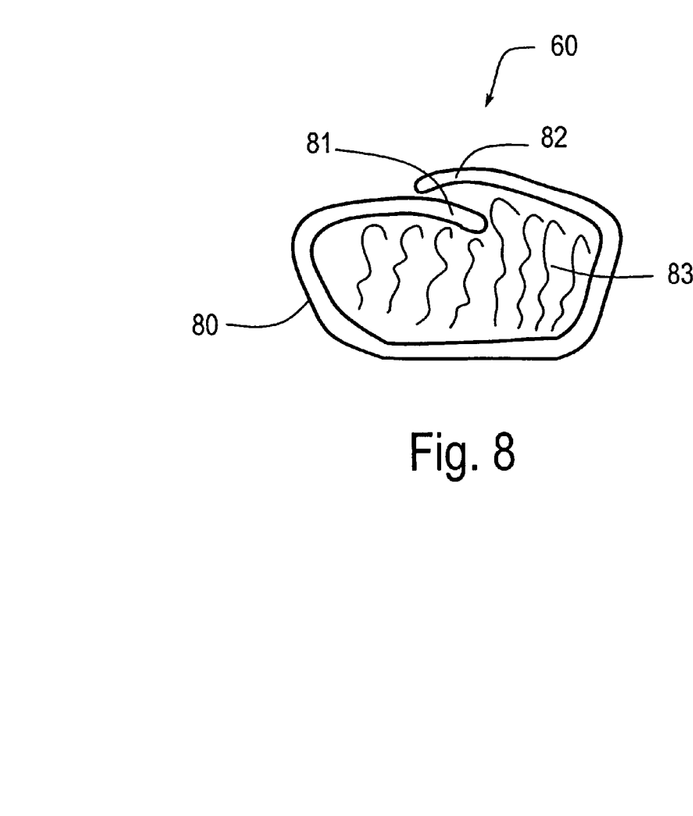
FIG. 8 is a side elevation view of the pasta shell including a filling with leaves of the pasta shell folded on top of one another and around the filling according to one preferred embodiment of the invention.

As shown in FIGS. 7 and 8, the pasta shell 80 includes leaves 81 and 82. A pasta shell filling 83 is inserted in the pasta shell 80 when the pasta shell 80 is placed in the mold cup 20 and the conveyor 10 moves the mold cup 20 to the filling station 30. After the pasta shell filling 83 is inserted in the pasta shell 80, the mold cup 20 is moved to the folding station 40. When the mold cup 20 is closed at the folding station 40, the leaves 81 and 82 of the pasta shell 80 are folded around the pasta shell filling 83 and the leaf 82 is folded over the leaf 81 to form the folded, filled pasta shell 60. The pasta shell filling 83 assists in holding together the folded leaves 81 and 82.

Figure 9:
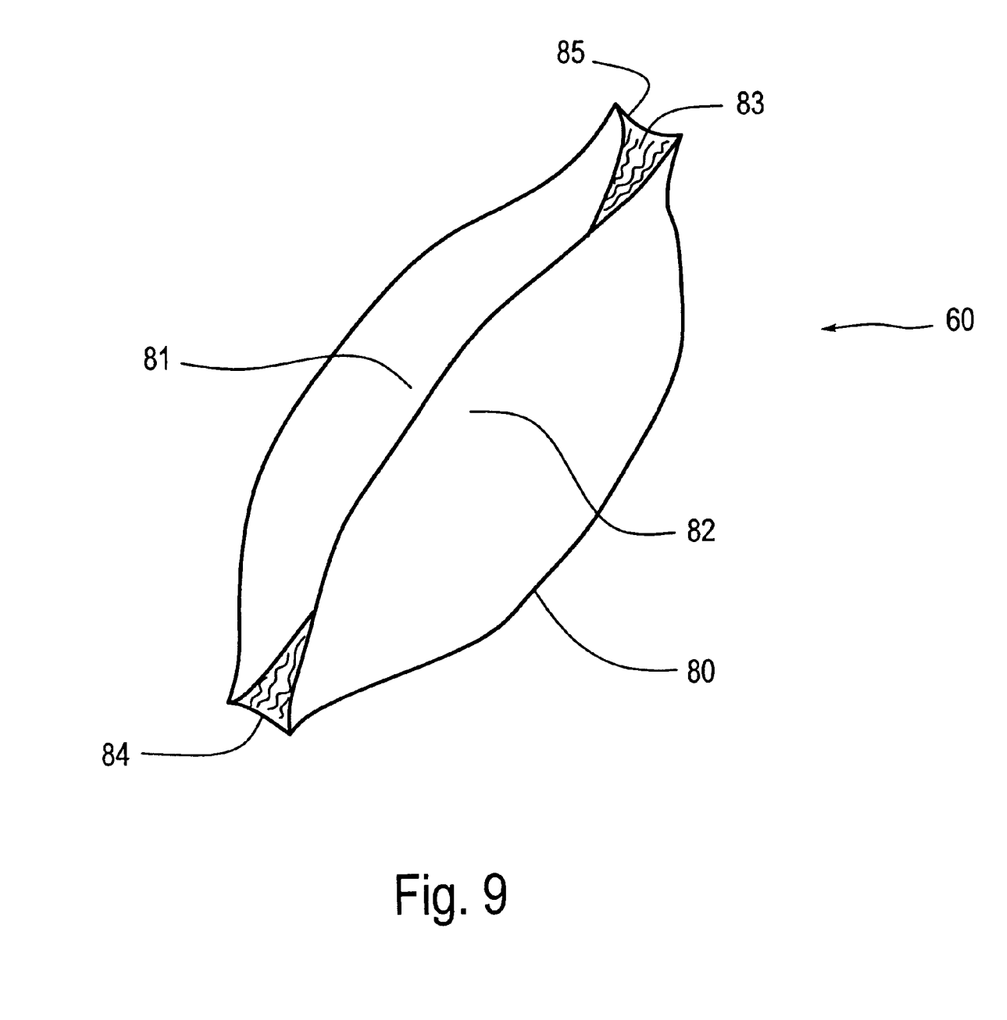
FIG. 9 is a perspective view of the pasta shell including a filling with leaves of the pasta shell folded on top of one another and around the filling according to one preferred embodiment of the invention.

As shown in FIG. 9, when the leaves 81 and 82 of the pasta shell 80 are folded around the pasta shell filling, the ends 84 and 85 of the folded, filled pasta shell 60 remain open to allow for expansion or contraction of the pasta shell filling 83. Although the folded, filled pasta shell has been shown as having open ends, it should be appreciated that each leaf 81, 82 may have a clam shell like shape so that ends of the folded, filled pasta shell 60 are substantially closed when the leaves 81, 82 are folded on top of one another. This embodiment could be used where expansion and contraction of the pasta shell filling are not involved. It should also be appreciated that the leaves 81 and 82 may be folded around the pasta shell filling 83 without being folded on top of one another.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A machine for handling a flexible food product, comprising:
   a conveyor;
   a mold cup attached to the conveyor, the mold cup including first and second mold cup portions that are openable to receive a filling, the first and second mold cup portions each being positioned in a plane out of parallel with the conveyor when in an open state and when receiving the filling, and wherein the first and second mold cup portions each pivot about an axis substantially parallel to a conveying direction of the conveyor; and
   a folding station that causes the first and second mold cup portions to fold leaves of the flexible food product over the filling to form a folded, filled food product, the first and second cup portions opening following folding of the leaves to release the folded, filled food product.

2. The machine according to claim 1 herein the conveyor has an adjustable speed.

3. The machine according to claim 1 wherein the folding station includes rollers that engage the mold cup to close the mold cup.

4. The machine according to claim 1 further comprising at least one rolling station that rolls the food product into a final shape, the at least one rolling station including a stationary plate that engages the food product after the food product exits the mold cup.

5. The machine according to claim 4 wherein the plate is adjustable.

6. The machine according to claim 1 further comprising at least one rolling station that rolls the food product into a final shape, the at least one rolling station including a top conveyor that engages the food product after the food product exits the mold cup.

7. The machine according to claim 6 wherein the top conveyor has an adjustable speed.

8. The machine according to claim 1, further comprising a filling station, upstream of the folding station, at which the filling is inserted within the food product, located within the mold cup, while the mold cup is open.

9. A method for filling a pasta shell, comprising:
   providing a machine according to claim 8;
   conveying a pasta shell within the mold cup to the filling station;
   filling the pasta shell with a pasta shell filling; and
   closing the mold cup to fold leaves of the pasta shell around the pasta shell filling.

10. The method according to claim 9, wherein ends of the pasta shell are substantially closed upon closing of the mold cup.

11. The method according to claim 9, wherein the mold cup opens after closing of the mold cup.

12. The machine according to claim 8 wherein the filling station includes at least one hopper that dispenses a predetermined amount of filling.

13. The machine according to claim 12 wherein the at least one hopper comprises a plurality of hoppers.

14. The machine according to claim 1, further comprising a rolling station that rolls the folded, filled food product, after being removed from the mold cup, into a final shape.

15. The machine according to claim 1 wherein the first and second mold cup portions are substantially identical halves of the mold cup.

16. The machine according to claim 1 wherein the mold cup is not rotatable about an axis perpendicular to the conveyor.

17. The machine according to claim 1 further comprising at least one rolling station that rolls the food product into a final shape after being released from the mold cup, the at least one rolling station comprising a rolling conveyor oriented in a direction transverse to a direction of the conveyor.

18. A machine for handling a flexible food product, comprising:
   a conveyor;
   a mold cup attached to the conveyor, the mold cup consisting essentially of a first cup portion and a second cup portion pivotable relative to the first cup portion, wherein the first and second cup portions each pivot about an axis substantially parallel to a conveying direction of the conveyor; and
   a folding station that causes the first and second mold cup portions to each separately fold a respective leaf of the flexible food product over a filling to form a folded, filled food product, the first and second cup portions opening, following folding of the leaves, to release the folded, filled food product.

19. The machine according to claim 18, further comprising at least one filling station, upstream of the folding station, at which the filling is inserted within the food product, located within the mold cup, while the mold cup is open.

20. The machine according to claim 19 wherein the at least one filling station includes at least one hopper that dispenses a predetermined amount of the filling.

21. The machine according to claim 20 wherein the at least one hopper comprises a plurality of hoppers.

22. The machine according to claim 18 wherein the mold cup is not rotatable about an axis perpendicular to the conveyor.

23. The machine according to claim 18, wherein the first and second mold cup portions are substantially identical.

24. The machine according to claim 18 wherein the conveyor has an adjustable speed.

25. The machine according to claim 18 wherein the folding station includes rollers that engage the mold cup to close the mold cup.

26. A machine for handling a flexible food product, comprising:
   a conveyor;
   a mold cup attached to the conveyor, the mold cup consisting essentially of a first cup portion and a second cup portion that each pivot about an axis; and
   a folding station that causes the first and second mold cup portions to simultaneously close.

27. The machine according to claim 26 wherein the folding station includes rollers that engage the mold cup to close the mold cup.

28. A machine for handling a flexible food product, comprising:
   a conveyor;
   a mold cup attached to the conveyor, the mold cup consisting essentially of a first cup portion and a second cup portion pivotable relative to the first cup portion; and a folding station that causes the first and second mold cup portions to assume a closed position to fold leaves of the flexible food product over a filling to form a folded, filled food product, the first and second cup portions opening, following folding of the leaves, to release the folded, filled food product, the first and second mold cup portions each being positioned in a plane out of parallel with the conveyor when in the closed position, and the food product being held between the first and second cup portions when the first and second cup portions are in the closed position.

29. The machine according to claim 28 wherein the folding station includes rollers that engage the mold cup to close the mold cup.

30. A machine for handling a flexible food product, comprising:

a conveyor;

a mold cup attached to the conveyor, the mold cup including first and second cup portions that are openable to receive a filling; and a folding station comprising forming rolls that cause the first and second mold cup portions to each separately fold a respective leaf of the flexible food product over the filling to form a folded, filled food product.

31. The machine according to claim 30, wherein the forming rolls rotate about an axis that is out of parallel with the plane of the conveyor.

32. The machine according to claim 30, wherein the forming rolls are positioned above a plane of the conveyor.

* * * * *